Dec. 18, 1956  E. E. DORKINS  2,774,496
TRACTOR MOUNTED HIGH LIFT LOADER
Filed Aug. 3, 1955  3 Sheets-Sheet 1

INVENTOR.
Evan E. Dorkins.
BY
Fishburn + Mullendore
ATTORNEYS.

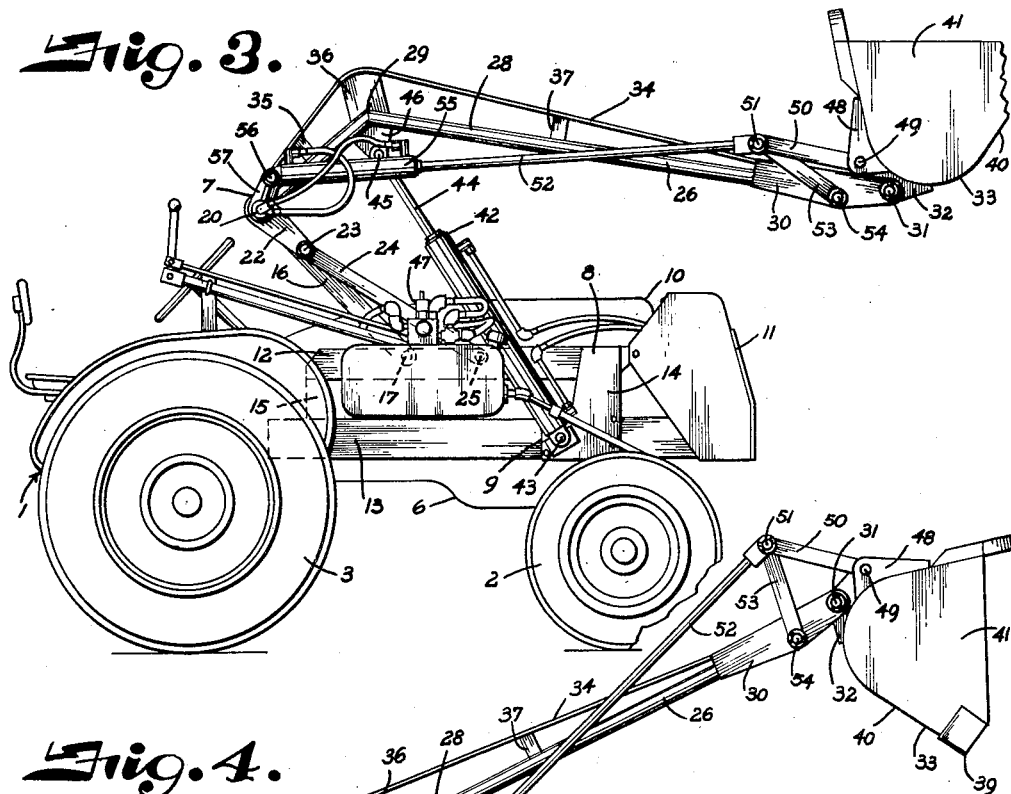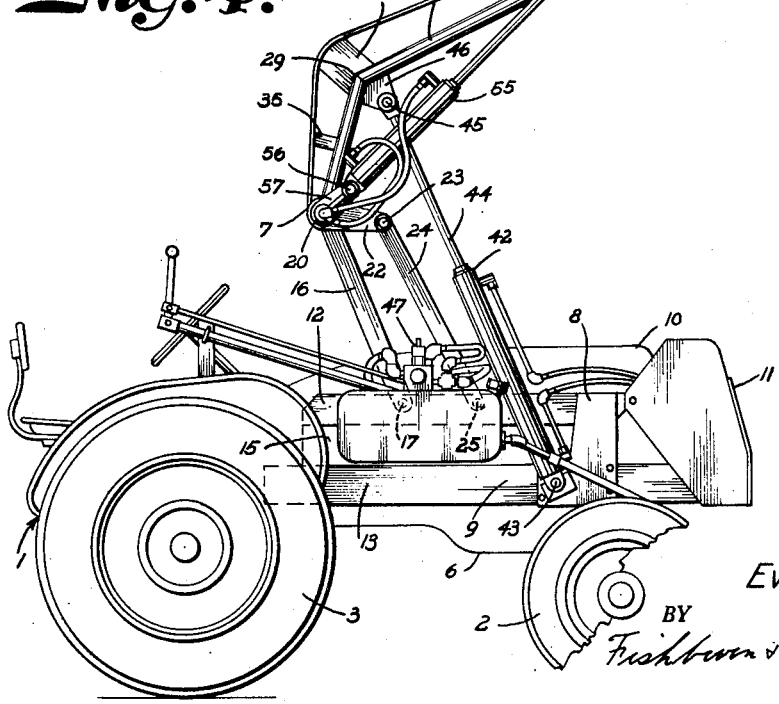

Dec. 18, 1956 E. E. DORKINS 2,774,496
TRACTOR MOUNTED HIGH LIFT LOADER
Filed Aug. 3, 1955 3 Sheets-Sheet 3
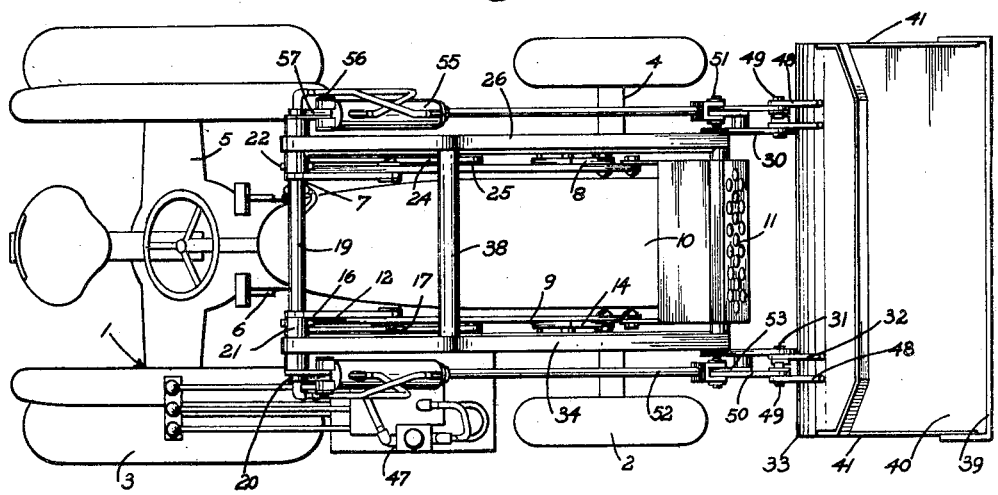
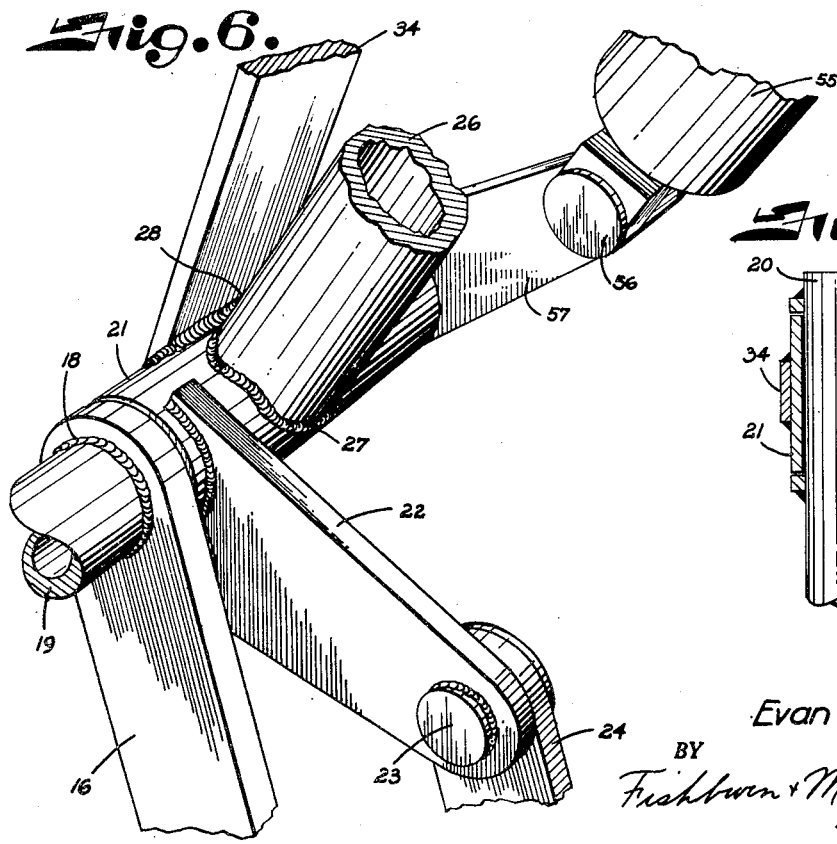
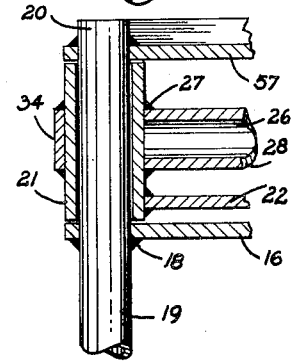
INVENTOR.
Evan E. Dorkins.
BY
Fishburn + Mullendore
ATTORNEYS.

United States Patent Office 2,774,496
Patented Dec. 18, 1956

2,774,496

TRACTOR MOUNTED HIGH LIFT LOADER

Evan E. Dorkins, Ottawa, Kans., assignor to Ottawa Steel, Inc., Ottawa, Kans., a corporation of Kansas Application August 3, 1955, Serial No. 526,262

8 Claims. (Cl. 214—140)

This invention relates to new and useful improvements in tractor mounted material handling implements, and more particularly, to a high lift mobile excavator and loader.

The objects of the present invention are to provide a tractor mounted material handling implement having a shovel or bucket adjacent the front portion of a tractor vehicle and mounted on the ends of two arms which straddle the tractor with the rear ends of said arms movably supported on links and arm lifting mechanism for lifting the shovel to a considerable heighth and to a position far enough in front of the tractor for dumping with intermediate lifted positions of the bucket being such that the load thereon does not tilt the tractor forwardly; to provide such a material handling implement wherein the rear ends of the lift arms are pivotally mounted and supported by pairs of connected links and levers which cooperate with the arms in moving the rear end pivots thereof rearwardly during initial lifting of the bucket and then forwardly during the remaining lifting to its ultimate heighth; to provide such a high lift material handling implement with bucket controls and for selectively tilting the bucket and for maintaining the bucket in selected level position during lifting; to provide a high lift material handling implement capable of handling large loads relative to the weight and size of the tractor on which it is mounted; and to provide a high lift material handling implement that is relatively light in weight, economical to manufacture, and efficient in operation wherein the bucket is under continuous hydraulic control.

In accomplishing these and other objects of the present invention, I have provided improved details of structure, the preferred form of which is illustrated in the accompanying drawings, wherein:

Fig. 3 is a view similar to Fig. 2 showing the bucket in a further raised position.

Fig. 4 is a view similar to Fig. 3 with the bucket further raised and in dumping position.

Fig. 5 is a plan view of the tractor and material handling implement thereon.

Fig. 6 is an enlarged detail perspective view showing the connections of the links and levers at the pivotal mounting of the rear ends of the lift arm.

Fig. 7 is a transverse sectional view through the pivotal mounting of the lift arms.

Figure 1:
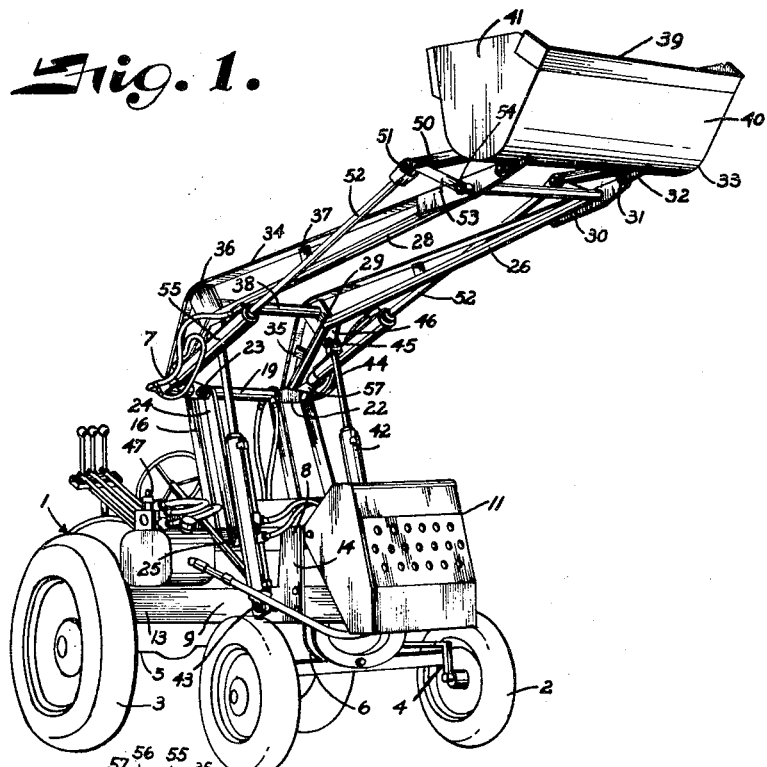
Fig. 1 is a perspective view of the material handling implement embodying the invention mounted on a tractor and in partially lifted position.

Referring more in detail to the drawings:

1 designates a tractor vehicle having front wheels 2 and rear wheels 3 supporting axles 4 and 5 respectively, for carrying the tractor frame 6. The details of the tractor form no part of my invention except so far as they are mentioned in the supporting and operation of the material handling equipment, as later described.

Material handling equipment generally designated 7 is operatively supported on the tractor 1 and includes a supporting frame 8 suitably mounted on the tractor frame 6. The supporting frame 8 has side members 9 arranged on each side of the tractor frame and suitably secured thereto. The forward ends of the side members 9 project forwardly relative to the radiator 10 of the tractor and are connected by a transverse member 11 to form a rigid structure, the member 11 serving as a grille that extends across in front of the radiator to protect same. Each side frame preferably consists of vertically spaced upper and lower members 12 and 13 respectively connected by forward and rearward posts 14 and 15 to rigidly support the upper member 12 from the lower member 13 which is preferably secured to the tractor frame 6.

Support links 16 have their lower ends swingably mounted on the upper members 12 of the side members of the mounting frame by pins 17 preferably intermediate the axles 4 and 5. In the illustrated structure, the pivotal mounting of the support links 16 is substantially midway between the axles 4 and 5. The support links 16 extend generally upwardly and rearwardly from the side members 9 and have their upper ends secured as by welding as at 18 to a crossbar or shaft 19 whereby the support links 16 swing together and swing the crossbar 19 about the axis of the pins 17 but the crossbar is not rotatable relative to the links 16. The crossbar 19 has extensions or trunnions 20 that project laterally beyond the links 16 and sleeves 21 are rotatably mounted on each extension 20. The ends of the sleeves 21 adjacent the support links have diagonal brace levers 22 fixed thereto and extending generally forwardly and downwardly therefrom, the free ends of the diagonal brace levers being pivotally connected by pins 23 to the upper ends of diagonal brace links 24, the lower ends of said diagonal brace links being connected by pins 25 to the upper member 12 of the side members 9 in forwardly spaced relation to the pivot pins 17. It is preferable that the pins 17 and 25 be in a substantially horizontal plane and that the spacing therebetween be slightly greater than the spacing between the axes of the pins 23 and extensions 20 whereby the links 16 and 24, lever 22 and crossbar 19 cooperate to provide a semi-floating supporting structure mounted on the side frames 9 for carrying a pair of lift arms 26.

The lift arms 26 have their rear ends rigidly secured as by welding at 27 to the sleeve 21 whereby the sleeve 21 and extension 20 form a pivotal mounting for the rear ends of said lift arms. In the illustrated structure the lift arms are spaced to straddle the tractor and each includes a tubular member 28 having forward and rearward portions in angular relationship connected as at 29, the forward end of the arms being secured to plates 30 with the forward end of said plates pivotally connected as by pins 31 to ears 32 secured to the rear of a shovel or bucket 33. The lift arms preferably are each in the form of a truss for lightness in weight and include a bar 34 having one end connected to the respective plate 30 and the other end connected to the respective sleeve 21 with the intermediate portions retained in spaced relation to the tubular member 28 by spaced plates 35, 36 and 37, the plate 36 being arranged at the point of connection of the angular portions of the tubular member 28. The lift arms 26 are connected intermediate their length by a transverse member 38, preferably having its ends secured to the plates 36 of the respective arms.

In the illustrated structure, the bucket 33 is what may be termed a "digging" bucket having a cutting edge 39 on the forward edge of the bottom wall 40 which wall extends rearwardly and is curved upwardly and forwardly to provide a front opening bucket, the ends being closed by walls 41. Alternative material handling instrumentalities, such as scoops, different shaped buckets and the like, may be substituted for the bucket illustrated.

Raising and lowering of the lifting arms 26 is accomplished by means of double acting cylinders 42, one for each of the arms 26, and operatively connected thereto. Each cylinder has one end pivotally mounted on a pin 43 carried by the lower member 13 of the side members 9 whereby the pin 43 is forwardly of and below the pins 25 and the piston or ram of the respective cylinder has its rod 44 extending from the other end of the cylinder 42. The end of the rod remote from the cylinder is pivotally connected by a pin 45 to a depending ear 46 on the respective lift arm 26 adjacent the plates 36, the spacing of the pins for the respective parts being such that throughout substantially all of the limits of movement of the lift arms the cylinders are inclined similarly to the inclination of the support links 16. The cylinders 42 are in a hydraulic circuit and under the control of a suitable operator-controlled valve mechanism 47 which permits introduction of fluid pressure to one of the ends of the cylinders while exhausting from the other and which permits retention of fluid pressure in both ends of the cylinder to hold the piston in any desired set position.

The bucket 33 is provided with rearwardly extending ears 48 which are pivotally connected by pins 49 with forward ends of bucket links 50, the pins 49 being spaced upwardly on the bucket relative to the pins 31. The other ends of the bucket links 50 are pivotally connected by pins 51 to the ends of bucket cylinder rams or piston rods 52. The pins 51 also form a pivotal connection between the end of the piston rods and links 50 with one end of bucket link levers 53 which have their other ends pivotally connected by pins 54 to the respective plates 30 at the forward ends of the arms 26. The piston rods 52 are each arranged laterally outwardly from the lift arm 26 and extend from one end of respective bucket cylinders 55, the other ends of the bucket cylinders being pivotally connected as by pins 56 with the ends of bucket cylinder arms or lever 57 which have their other ends rigidly secured as by welding to the outer portions of the crossbar extensions 20. It is preferable that the bucket cylinder arms 57 and support links 16 are each suitably spaced and arranged at opposite ends of the sleeve 21 to limit lateral movement of the sleeve on the respective extension 20. Also, the bucket cylinder arms or levers 57 are arranged at an angular relationship with the support links 16 whereby the swinging movement of the support links 16 during lifting movement of the lift arms 26 tends to maintain selected level position of the bucket when the piston rods 52 and cylinders 55 are maintained in a set position during such lifting movement. The bucket cylinders 55 are in an hydraulic circuit and under control of suitable operator controlled valve mechanism which permits introduction of pressure fluid at one end of the cylinders while exhausting from the other and permits retention of fluid in both ends of the cylinder to hold the piston in any desired set position.

Figure 2:
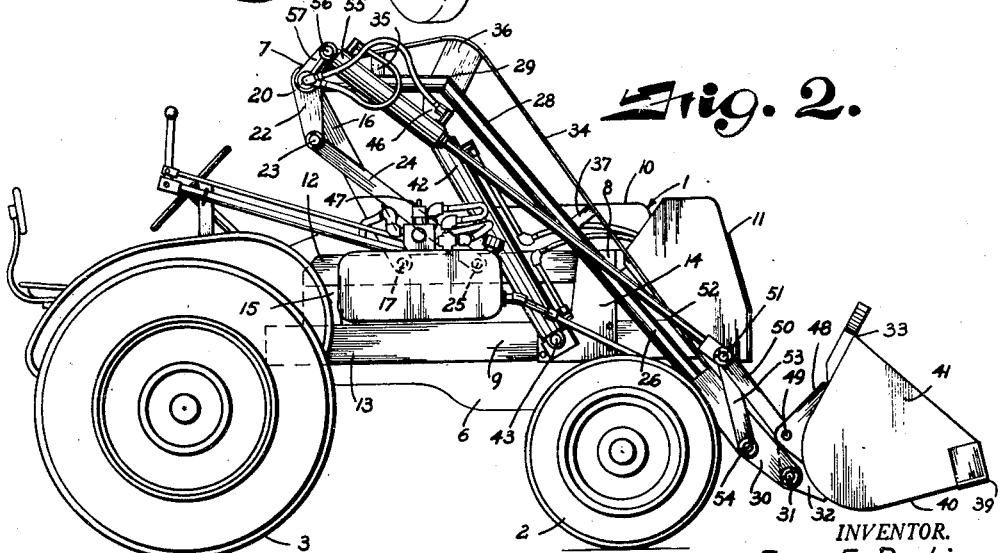
Fig. 2 is a side elevation of the tractor with an implement thereon with the bucket slightly raised from ground level.

When using a material handling equipment constructed and assembled as described, and when starting to load, the valve 47 is operated to apply fluid pressure to the cylinders 42 to effect retraction of the piston rod therein and lower the lift arms 26 to bring the bucket 33 into contact with the ground at which position it is close to the front end of the tractor as illustrated in Fig. 2. The valve mechanism is then operated to apply fluid pressure to the bucket cylinders 55 to extend the piston rods 52 therefrom to swing the ends of the piston rods on the bucket link levers 53 about the pins 54 whereby the bucket links 50 cause the bucket to be tilted downwardly on the pins 51 to engage the cutting edge 39 at the desired digging angle with the ground. The tractor is then moved forward to fill the bucket and the valve mechanism again operated to apply fluid pressure to the bucket cylinders 55 to retract the piston rods therein to swing the end of the piston rods on the bucket links levers 53 about the pins 54 whereby they operate through the links 50 to tilt the bucket upwardly to the position shown in Fig. 2. Then the valve mechanism 47 is operated to apply fluid pressure to the cylinders 42 to extend the piston rods 44 therefrom to effect lifting of the lift arms 26. During such lifting movement the diagonal brace levers 22 are also swung through the same angle as are the lifting arms 26 and through the connection of the diagonal brace levers 22 with the diagonal brace links 24 to the side members of the frame, the support link and diagonal brace link are moved to rock the support links rearwardly whereby the crossbar in effect is swung rearwardly and downwardly about the pin 17. Therefore, instead of the bucket being moved forwardly as it is moved upwardly by lifting of the lift arms 26, as would occur if the crossbar remained in the position shown in Fig. 2, the crossbar is swung rearwardly whereby the bucket remains during its lifting movement in close proximity to the front of the tractor. The rearward swinging movement of the support links 16 occurs through substantially one-half of the total movement of the lift arms 26 to the position shown in Fig. 3. Then on further lifting movement of the lift arms 26, the support links 16 are swung forwardly, swinging the crossbar 19 forwardly and upwardly whereby the bucket is moved outwardly sufficiently to dump into a truck or like when in its elevated position as shown in Fig. 4.

Due to the constant angular position of the bucket cylinder arms or levers 57 and the support links 16, since both are rigidly secured to the cross arm 19 and the extensions 20, the swinging movement of the support links 16, and the resulting swinging movement of the bucket cylinder arms 57 moves the rear end of the bucket cylinders 55 whereby the bucket is tilted rearwardly during the first half of the lifting movement of the lift arms 26 to a position shown in Fig. 3, and then on the further lifting movement, the level position of the bucket is substantially maintained reducing tendency of material to be dumped rearwardly out of the bucket. The geometry of the linkages for the lifting and control of the excavating apparatus is such that the maximum lifting force at the bucket is attained when the bucket is in a position two to four feet above the ground on which the tractor operates. This position of the bucket is substantially the loaded transport position thereof and shocks due to the vehicle or tractor traveling over rough terrain is minimized due to the lower pressure required in the hydraulic system.

If it is desired to move the tractor when the bucket is partially elevated, it may be done without danger of tipping the tractor over forwardly due to the close relationship of the bucket to the forward end of the tractor and the effect of shortening the lever of the load in the bucket relative to the center of gravity of the tractor. When the lift arms are elevated to a desired position of the bucket for dumping, the hydraulic valve mechanism is actuated to again apply fluid pressure to the bucket cylinders 55 to extend the piston rods therefrom whereby the bucket is tilted to dump the load as illustrated in Fig. 4. Then the valve mechanism is actuated to again apply fluid pressure to the cylinders 42 to retract the piston rods 44 therein and lower the lift arms and bucket to loading position adjacent the ground.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. In a material handling implement for attachment to a tractor, a frame, laterally spaced arms one on each side of the tractor and extending forwardly thereof, a bucket mounted adjacent the forward end of the arms and positioned adjacent the forward end of the tractor when the arms are in lowered position, support links having lower ends pivotally connected to the frame, a crossbar extending transversely of the tractor and fixed to the upper portions of the support links, bearing means on the rearward portions of the arms and pivotally mounted on the crossbar for swinging movement of said arms, levers fixed relative to the bearing means and swingable with the arms, brace links pivotally connecting said levers with the frame in spaced relation to the support links, and hydraulically operated lifting means supported by the frame and connected to the arms intermediate the length thereof for raising and lowering said lifting arms.

2. In a material handling implement for attachment to a tractor, a frame, laterally spaced arms one on each side of the tractor and extending forwardly thereof, means intermediate the length of the arms rigidly connecting same, support links arranged on each side of the tractor and having lower ends pivotally connected to the frame, a crossbar extending transversely of the tractor and fixed to the upper portions of the support links, means pivotally mounting the rearward portions of the arms on the crossbar for swinging movement of said arms, levers fixed relative to said arms and swingable therewith about the axis of the pivotal mounting means thereof, brace links pivotally connecting said levers with the frame in forwardly spaced relation to the support links whereby said support links are normally inclined upwardly and rearwardly from the pivotal connection thereof with the frame, and hydraulically operated lifting means supported by the frame and connected to the arms intermediate the length thereof for raising and lowering said lifting arms and cooperating with the support links and brace links and their connection with the lever and crossbar whereby the crossbar is swung rearwardly and then forwardly on the support links as the lift arms are moved upwardly.

3. In a material handling implement for attachment to a tractor, a frame having side members extending along each side of the tractor, laterally spaced arms one on each side of the tractor and extending forwardly thereof, means intermediate the length of the arms rigidly connecting same, a bucket mounted adjacent the forward end of the arms and positioned adjacent the forward end of the tractor when the arms are in lowered position, support links arranged on each side of the tractor and having lower ends pivotally connected to the frame side members, a crossbar extending transversely of the tractor and fixed to the upper portions of the support links, bearing means fixed to the rearward portions of the arms and pivotally mounted on the crossbar for swinging movement of said arms, levers fixed to the bearing means and swingable with the arms about the axis of the bearing means, brace links pivotally connected to said levers in spaced relation to the bearing means and having pivotal connection with the frame in forwardly spaced relation to the support links whereby said support links are normally inclined upwardly and rearwardly from the pivotal connection thereof with the side members of the frame, and hydraulically operated lifting means supported by the frame and connected to the arms intermediate the length thereof for raising and lowering said lifting arms and cooperating with the support links and brace links and their connection with the lever and crossbar whereby the crossbar is swung rearwardly on the support links as the lift arms are moved upwardly and then swung forwardly on the support links as the lifting movement continues to the upper position thereof to project the bucket forwardly relative to its initial lowered position.

4. In a material handling implement for attachment to a tractor, a frame, laterally spaced arms one on each side of the tractor and extending forwardly thereof, a bucket pivotally mounted adjacent the forward ends of the arms and positioned adjacent the forward end of the tractor when the arms are in lowered position, support links pivotally connecting the rearward portion of the arms to the frame, levers fixed relative to the arms and swingable therewith, brace links pivotally connecting said levers with the frame, lifting means supported by the frame and applied to the arms intermediate the length thereof, levers fixed relative to the support links, and hydraulically operated means carried by said second-named levers and operatively connected to the bucket in vertically spaced relation to the pivotal mounting thereof for tilting said bucket about its pivotal mounting and holding it in selected positions of tilt.

5. In a material handling implement for attachment to a tractor, a frame having side members extending along each side of the tractor, laterally spaced arms one on each side of the tractor and extending forwardly thereof, means intermediate the length of the arms rigidly connecting same, a bucket pivotally mounted adjacent the forward ends of the arms and positioned adjacent the forward end of the tractor when the arms are in lowered position, support links pivotally connecting the rearward portion of the arms to the frame, levers fixed relative to the arms and swingable therewith, brace links pivotally connecting said levers with the frame in forwardly spaced relation to the support links, lifting means supported by the frame and applied to the arms intermediate the length thereof, levers fixed relative to the support links at the pivotal connection thereof with the arms, and hydraulically operated means carried by said second-named levers and operatively connected to the bucket in vertically spaced relation to the pivotal mounting thereof for tilting said bucket about its pivotal mounting and holding it in selected positions of tilt.

6. In a material handling implement for attachment to a tractor, a frame, laterally spaced arms one on each side of the tractor and extending forwardly thereof, a bucket pivotally mounted adjacent the forward end of the arms and positioned adjacent the forward end of the tractor when the arms are in lowered position, support links arranged on each side of the tractor and having lower ends pivotally connected to the frame, a crossbar extending transversely of the tractor and fixed to the upper portion of the support links, bearing means fixed to the rearward portions of the arms and pivotally mounted on the crossbar for swinging movement of said arms, levers fixed to the bearing means and swingable with the arms, brace links pivotally connecting said levers with the frame, hydraulically operated lifting means supported by the frame and connected to the arms intermediate the length thereof for raising and lowering said lifting arms, hydraulically operated means connected to the crossbar and extending therefrom toward the bucket, and means operatively connecting the forward end of the hydraulically operated means to the bucket in vertically spaced relation to the pivotal mounting thereof whereby operation of the hydraulically operated means tilts the bucket about its pivotal mounting and holds it in selected positions of tilt.

7. In a material handling implement for attachment to a tractor, a frame, laterally spaced arms one on each side of the tractor and extending forwardly thereof, a bucket pivotally mounted adjacent the forward end of the arms and positioned adjacent the forward end of the tractor when the arms are in lowered position, support links arranged on each side of the tractor and having lower ends pivotally connected to the frame, a crossbar extending transversely of the tractor and fixed to the upper portions of the support links, bearing means fixed to the rearward portions of the arms and pivotally mounted on the crossbar for swinging movement of said arms, levers fixed to the bearing means and swingable with the arms, brace links pivotally connecting said levers with the frame in forwardly spaced relation to the support links whereby said support links are normally inclined upwardly and rearwardly from the pivotal connection thereof with the frame, hydraulically operated lifting means supported by the frame and connected to the arms intermediate the length thereof for raising and lowering said lifting arms and cooperating with the support links and brace links and their connection with the lever and crossbar whereby the crossbar is swung rearwardly on the support links as the lift arms are moved upwardly and then swung forwardly on the support links as the lifting movement continues to the upper position thereof to project the bucket forwardly relative to its initial lowered position, levers fixed to the crossbar and extending forwardly therefrom, hydraulically operated means connected to the ends of the second-named levers and extending therefrom toward the bucket, a connecting link pivotally connecting the forward end of the hydraulically operated means to the bucket in vertically spaced relation to the pivotal mounting thereof, and means movably engaging the bucket link whereby operation of the hydraulically operated means tilts the bucket about its pivotal mounting and holds it in selected positions of tilt.

8. In a material handling implement for attachment to a tractor, a frame having side members extending along each side of the tractor, laterally spaced arms one on each side of the tractor and extending forwardly thereof, means intermediate the length of the arms rigidly connecting same, a bucket pivotally mounted adjacent the forward end of the arms and positioned adjacent the forward end of the tractor when the arms are in lowered position, support links arranged on each side of the tractor and having lower ends pivotally connected to the frame side members, a crossbar extending transversely of the tractor and fixed to the upper portions of the support links, bearing means fixed to the rearward portions of the arms and pivotally mounted on the crossbar for swinging movement of said arms, levers fixed to the bearing means and swingable with the arms, brace links pivotally connecting said levers with the frame in forwardly spaced relation to the support links whereby said support links are normally inclined upwardly and rearwardly from the pivotal connection thereof with the side members of the frame, hydraulically operated lifting means supported by the frame and connected to the arms intermediate the length thereof for raising and lowering said lifting arms and cooperating with the support links and brace links and their connection with the lever and crossbar whereby the crossbar is swung rearwardly on the support links as the lift arms are moved upwardly and then swung forwardly on the support links as the lifting movement continues to the upper position thereof to project the bucket forwardly relative to its initial lowered position, levers fixed to the crossbar and extending forwardly therefrom at an oblique angle to the support links, hydraulically operated means connected to the ends of the second-named levers and extending therefrom toward the bucket, a connecting link pivotally connecting the forward end of the hydraulically operated means to the bucket in vertically spaced relation to the pivotal mounting thereof, and a bucket lever pivotally mounted on the arms adjacent the forward ends thereof and pivotally connected to the pivotal connection of the hydraulically operated means and bucket link whereby operation of the hydraulically operated means tilts the bucket about its pivotal mounting and holds it in selected positions of tilt.

References Cited in the file of this patent
UNITED STATES PATENTS
2,593,500    Thierry _____ Apr. 22, 1952